(12) United States Patent
Maruri et al.

(10) Patent No.: US 8,581,653 B1
(45) Date of Patent: Nov. 12, 2013

(54) TECHNIQUES FOR PROVIDING CLOCK SIGNALS IN CLOCK NETWORKS

(75) Inventors: Victor Maruri, Mountain View, CA (US); Arch Zaliznyak, San Jose, CA (US); Ramanand Venkata, Fremont, CA (US); Henry Y. Lui, Millbrae, CA (US)

(73) Assignee: Altera Corporation, San Jose, CA (US)

( * ) Notice: Subject to any disclaimer, the term of this patent is extended or adjusted under 35 U.S.C. 154(b) by 53 days.

(21) Appl. No.: 13/328,784

(22) Filed: Dec. 16, 2011

(51) Int. Cl.
  *G06F 1/04* (2006.01)
  *H03K 3/00* (2006.01)
(52) U.S. Cl.
  USPC ............ 327/291; 327/294; 327/295; 327/299
(58) Field of Classification Search
  USPC .......................................... 327/291, 295, 299
  See application file for complete search history.

(56) References Cited

U.S. PATENT DOCUMENTS 7,228,451 B1 * 6/2007 Nguyen et al. ................. 713/500

OTHER PUBLICATIONS

J. Lamoureux and S.J.E. Wilton, "FPGA Clock Network Architecture: Flexibility vs. Area and Power", in the ACM/SIGDA International Symposium on Field-Programmable Gate Arrays (FPGA), pp. 101-108, 2006.
Altera Corporation, "Stratix Architecture," Jul. 2005, Stratix Device Handbook, vol. 1, chpt. 2, pp. 1-140.
Altera Corporation, "Clock Networks and PLLs in Stratix IV Devices," Stratix IV Device Handbook vol. 1, Chpt. 5, Feb. 2011, pp. 1-54.
Altera Corporation, "Clock Networks and PLLs in Stratix V Devices," Stratix V Device Handbook vol. 2: Device Interfaces and Integration, chpt. 4, May 2011, pp. 1-34.

* cited by examiner

*Primary Examiner* — John Poos
(74) *Attorney, Agent, or Firm* — Steven J. Cahill (57) ABSTRACT

An integrated circuit includes a local clock network that is operable to provide a first clock signal and an interface circuit that is coupled to receive the first clock signal from the local clock network. The interface circuit is operable to generate a second clock signal based on the first clock signal. A clock line is coupled to the interface circuit. The clock line has a fixed length. The second clock signal is provided to a multiplexer circuit through the clock line. The multiplexer circuit provides a third clock signal based on the second clock signal. Another clock network is coupled to receive the third clock signal from the multiplexer circuit.

20 Claims, 8 Drawing Sheets

TECHNIQUES FOR PROVIDING CLOCK SIGNALS IN CLOCK NETWORKS

TECHNICAL FIELD

The present invention relates to electronic circuits, and more particularly, to techniques for providing clock signals in clock networks.

BACKGROUND

Clock networks, which are also known as clock trees, are used in integrated circuits to distribute clock signals. More particularly, in conventional clock networks, input clock signals are received through dedicated clock input pins. The clock signals are then distributed throughout the integrated circuit using a network of conductors and buffers. Clock networks typically include multiple layers of buffers to improve clock signal integrity.

Applications for integrated circuits often use clock signals that are provided to circuit elements in both halves of an integrated circuit. For example, an application of the optical transport network (OTN) 4 standard uses a high-speed serial interface (HSSI) on an integrated circuit to reach 21 clock signals concurrently that have access to the core circuitry of the integrated circuit. Some or all of these clock signals may need to be provided to circuit elements in both halves of the integrated circuit.

The Stratix® IV GX field programmable gate array (FPGA) integrated circuit designed by Altera Corporation of San Jose, Calif., includes global clock signals, quadrant clock signals, and regional clock signals. The Stratix IV GX FPGA includes numerous programmable logic circuits that are grouped into 4 quadrants on the integrated circuit.

Clock multiplexers near the four edges of the FPGA provide global clock signals to the 4 quadrants of programmable logic circuits on the FPGA. Clock multiplexers near the right and left sides of the FPGA provide global and quadrant clock signals from high-speed serial interfaces (HSSI) on the right and left sides of the FPGA, respectively, to the programmable logic circuits. Each of the quadrant clock signals is provided to only one quadrant of programmable logic circuits.

First and second sets of the regional clock signals are provided from a high-speed serial interface (HSSI) on the left side of the FPGA to first and second quadrants, respectively, of programmable logic circuits on the left side of the FPGA. Third and fourth sets of the regional clock signals are provided from an HSSI on the right side of the FPGA to third and fourth quadrants, respectively, of programmable logic circuits on the right side of the FPGA. Each of the regional clock signals is only provided to ⅛ of the core of programmable logic circuits on the FPGA.

The programmable interconnect conductors in the Stratix IV GX FPGA can be configured to provide a clock signal from a programmable logic circuit in one quadrant of the FPGA to one of the clock multiplexers near that quadrant. One of the clock multiplexers can be configured to drive a clock signal received from a programmable logic circuit as a global clock signal. One of the clock multiplexers can be configured to drive a clock signal received from a programmable logic circuit as a quadrant clock signal. However, the programmable interconnect conductors that route a clock signal from a programmable logic circuit to one of the clock multiplexers may have different lengths in different user configurations of the FPGA, depending on the path selected to route the clock signal through the programmable interconnect conductors. As a result, the programmable interconnect conductors may introduce an unpredictable amount of delay into the clock signal.

BRIEF SUMMARY

According to some embodiments, an integrated circuit includes a local clock network that is operable to provide a first clock signal and an interface circuit that is coupled to receive the first clock signal from the local clock network. The interface circuit is operable to generate a second clock signal based on the first clock signal. A clock line is coupled to the interface circuit. The clock line has a fixed length. The second clock signal is provided to a multiplexer circuit through the clock line. The multiplexer circuit provides a third clock signal based on the second clock signal. Another clock network is coupled to receive the third clock signal from the multiplexer circuit.

Various objects, features, and advantages of the present invention will become apparent upon consideration of the following detailed description and the accompanying drawings.

DETAILED DESCRIPTION

According to some embodiments described herein, a clock signal is provided from an interface circuit through a regional clock network, a local clock network, and a dedicated clock line to a global or a quadrant clock network. The regional clock network, the quadrant clock network, global clock network, the interface circuit, and the dedicated clock line are located in an integrated circuit. These embodiments allow the clock signal to be provided to circuitry in a larger area of the integrated circuit. For example, the clock signal may be provided to quadrants of programmable logic circuits on the integrated circuit that are in a different half of the integrated circuit than the interface circuit. Clock signals described herein are periodic signals.

Figure 1:
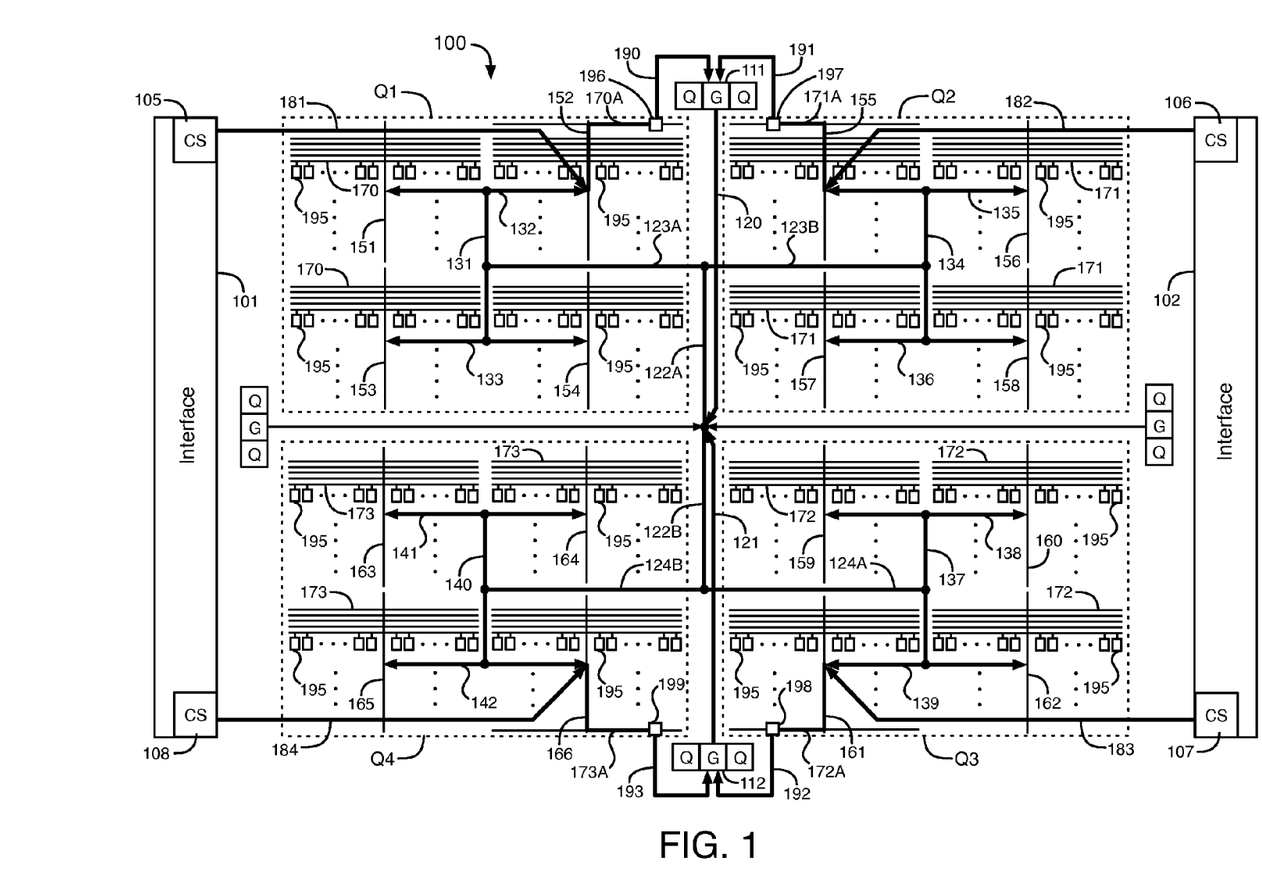
FIG. 1 illustrates a first embodiment of a technique for providing clock signals from an interface circuit through regional and local clock networks to a global clock network on an integrated circuit, according to an embodiment of the present invention.

FIG. 1 illustrates a first embodiment of a technique for providing clock signals from an interface circuit through regional and local clock networks to a global clock network on an integrated circuit, according to an embodiment of the present invention. FIG. 1 illustrates an integrated circuit 100. Integrated circuit 100 may be any type of integrated circuit, such as a programmable logic integrated circuit or an application specific integrated circuit.

Integrated circuit 100 includes interface circuits 101-102, global clock multiplexers circuits 111, global clock multiplexer circuits 112, four quadrants Q1-Q4 of circuit elements, a global clock network, quadrant clock networks, regional clock networks, and local clock networks. Interface circuit 101 includes clock signal (CS) generation circuits 105 and 108, and interface circuit 102 includes clock signal generation circuits 106 and 107. Clock signal generation circuit circuits 105-108 may include, for example, phase-locked loops and/or delay locked loops.

The global clock network includes conductors 120, 121, 122A-122B, 123A-123B, 124A-124B, and 131-142. The regional clock networks include conductors 181-184. The local clock networks include vertical conductors 151-154, 155-158, 159-162, and 163-166 in quadrants Q1, Q2, Q3, and Q4, respectively. The local clock networks also include horizontal conductors 170-173 in quadrants Q1-Q4, respectively. Only a subset of the horizontal conductors 170-173 are shown and identified in FIG. 1 to simplify the drawing. Each of the global, quadrant, regional, and local clock networks in integrated circuit 100 includes conductors as well as buffers and multiplexers that provide clock signals between the conductors.

Integrated circuit 100 also includes dedicated clock lines 190-193 and vertical input/output interface circuits 196-199. Vertical input/output interface circuits 196-199 are located in quadrants Q1-Q4, respectively. In addition, integrated circuit 100 includes numerous circuit elements 195 in each of the quadrants Q1-Q4. Each of the horizontal conductors 170-173 is coupled to several circuit elements 195. Circuit elements 195 may include, for example, programmable logic circuits. Each of the circuit elements 195 may, for example, include an array of programmable logic circuits.

In an embodiment of FIG. 1, each of the reference numerals 120, 121, 122A-122B, 123A-123B, 124A-124B, 131-142, 151-166, 170-173, 181-184, and 190-193 identifies a line that represents multiple parallel conductors.

In the embodiment of FIG. 1, clock signals are provided from interface circuits 101-102 through portions of the regional clock networks, portions of the local clock networks, vertical input/output interface circuits 196-199, dedicated clock lines 190-193, and the global clock multiplexers 111-112 to the global clock network. The clock signals are then provided from the global clock network to circuit elements 195 in each of the quadrants Q1-Q4 through the local clock networks. Portions of the regional, local, and global clock networks and the dedicated clock lines that are used to transmit these clock signals are indicated by thick black lines in FIG. 1.

Each of the 4 clock signal generation circuits 105-108 generates multiple periodic output clock signals. The clock signals generated by clock signal generation circuits 105, 106, 107, and 108 are provided to conductors 181, conductors 182, conductors 183, and conductors 184, respectively, in the regional clock networks.

The local clock networks in quadrants Q1-Q4 include vertical conductors 152, vertical conductors 155, vertical conductors 161, and vertical conductors 166, respectively. The clock signals generated by clock signal generation circuits 105, 106, 107, and 108 are provided from conductors 181, 182, 183, and 184 to vertical conductors 152, 155, 161, and 166, respectively. Each of the clock signals in conductors 181-184 is transmitted to a different one of the respective conductors 152, 155, 161, and 166. The clock signals are transmitted to conductors 152, 155, 161, and 166 from conductors 181-184, respectively, using buffers and/or multiplexers.

The local clock networks in quadrants Q1-Q4 include horizontal conductors 170A, horizontal conductors 171A, horizontal conductors 172A, and horizontal conductors 173A, respectively. Each of the 4 sets of horizontal conductors 170A-173A is a respective subset of horizontal conductors 170-173. The clock signals in conductors 152, 155, 161, and 166 generated by clock signal generation circuits 105-108 are transmitted to conductors 170A, 171A, 172A, and 173A, respectively. Each of the clock signals in conductors 152, 155, 161, and 166 is transmitted to a different one of the respective conductors 170A, 171A, 172A, and 173A using, for example, a buffer and/or a multiplexer.

The clock signals in conductors 170A, 171A, 172A, and 173A are provided to inputs of vertical input/output interface circuits 196, 197, 198, and 199, respectively. Vertical input/output interface circuits 196, 197, 198, and 199 include multiplexer circuits that select clock signals received from conductors 170A, 171A, 172A, and 173A to generate clock signals in dedicated clock lines 190, 191, 192, and 193, respectively.

In some embodiments, each of the dedicated clock lines 190-193 has a fixed and non-programmable length to generate a predictable delay in a clock signal transmitted through that clock line. In some embodiments, each of the dedicated clock lines 190-193 also has a non-programmable path through integrated circuit 100. A non-programmable path refers to a signal path, e.g., for clock lines 190-193, that is not movable within integrated circuit 100 during placement and routing. Each of reference numerals 190-193 refers to one clock line or multiple clock lines in parallel, and each of these clock lines may be, for example, one conductor or multiple conductors connected together in series by buffers. Vertical input/output interface circuits 196, 197, 198, and 199 transmit each of the selected clock signals to a different one of the dedicated clock lines 190, 191, 192, and 193, respectively.

The clock signals in clock lines 190-191 are provided to inputs of global clock multiplexers circuits 111. Global clock multiplexers 111 are configurable to transmit either the clock signals in clock lines 190 or the clock signals in clock lines 191 in parallel to conductors 120 in the global clock network. If global clock multiplexers 111 select clock lines 190, then each of the clock signals in clock lines 190 is transmitted to a different one of the conductors 120. If global clock multiplexers 111 select clock lines 191, then each of the clock signals in clock lines 191 is transmitted to a different one of the conductors 120.

The clock signals in clock lines 192-193 are provided to inputs of global clock multiplexer circuits 112. Global clock multiplexers 112 are configurable to transmit either the clock signals in clock lines 192 or the clock signals in clock lines 193 in parallel to conductors 121 in the global clock network. If global clock multiplexers 112 select clock lines 192, then each of the clock signals in clock lines 192 is transmitted to a different one of the conductors 121. If global clock multiplexers 112 select clock lines 193, then each of the clock signals in clock lines 193 is transmitted to a different one of the conductors 121.

The clock signals in conductors 120 and 121 are transmitted to conductors 122A in the global clock network, e.g., using buffers or multiplexers. The clock signals in conductors 120 and 121 are also transmitted to conductors 122B in the global clock network, e.g., using buffers or multiplexers. If a 2N number of clock signals are in an N number of parallel conductors 120 and an N number of parallel conductors 121, conductors 122A have at least 2N conductors, and conductors 122B have at least 2N conductors.

The clock signals in conductors 122A are transmitted to conductors 123A, e.g., using buffers and/or multiplexers. The clock signals in conductors 122A are also transmitted to conductors 123B, e.g., using buffers and/or multiplexers. The clock signals in conductors 122B are transmitted to conductors 124A, e.g., using buffers and/or multiplexers. The clock signals in conductors 122B are also transmitted to conductors 124B, e.g., using buffers and/or multiplexers.

The clock signals in conductors 123A, conductors 123B, conductors 124A, and conductors 124B are transmitted to conductors 131, conductors 134, conductors 137, and conductors 140, respectively, using buffers and/or multiplexers. The clock signals in conductors 131, conductors 134, conductors 137, and conductors 140 are transmitted to conductors 132-133, conductors 135-136, conductors 138-139, and conductors 141-142, respectively, using buffers and/or multiplexers. In an exemplary embodiment, the buffers and/or multiplexers that transmit the clock signals between portions of the global clock network are represented by dots shown in FIG. 1.

The clock signals in conductors 132, 133, 135, 136, 138, 139, 141, and 142 are transmitted to vertical conductors 151-152, 153-154, 155-156, 157-158, 159-160, 161-162, 163-164, and 165-166, respectively, through buffers and/or multiplexers. The clock signals received from conductors 132, 135, 139, and 142 are transmitted through different subsets of the conductors 152, 155, 161, and 166 than the subsets of the conductors 152, 155, 161, and 166 that are used to transmit the clock signals received from regional conductors 181-184, respectively, as described above.

The clock signals in vertical conductors 151-154, 155-158, 159-162, and 163-166 are provided to circuit elements 195 through horizontal conductors 170, 171, 172, and 173, respectively. Multiplexers and buffers in the local clock network are used to transmit the clock signals from vertical conductors 151-154, 155-158, 159-162, and 163-166 to horizontal conductors 170, 171, 172, and 173, respectively.

Figure 2:
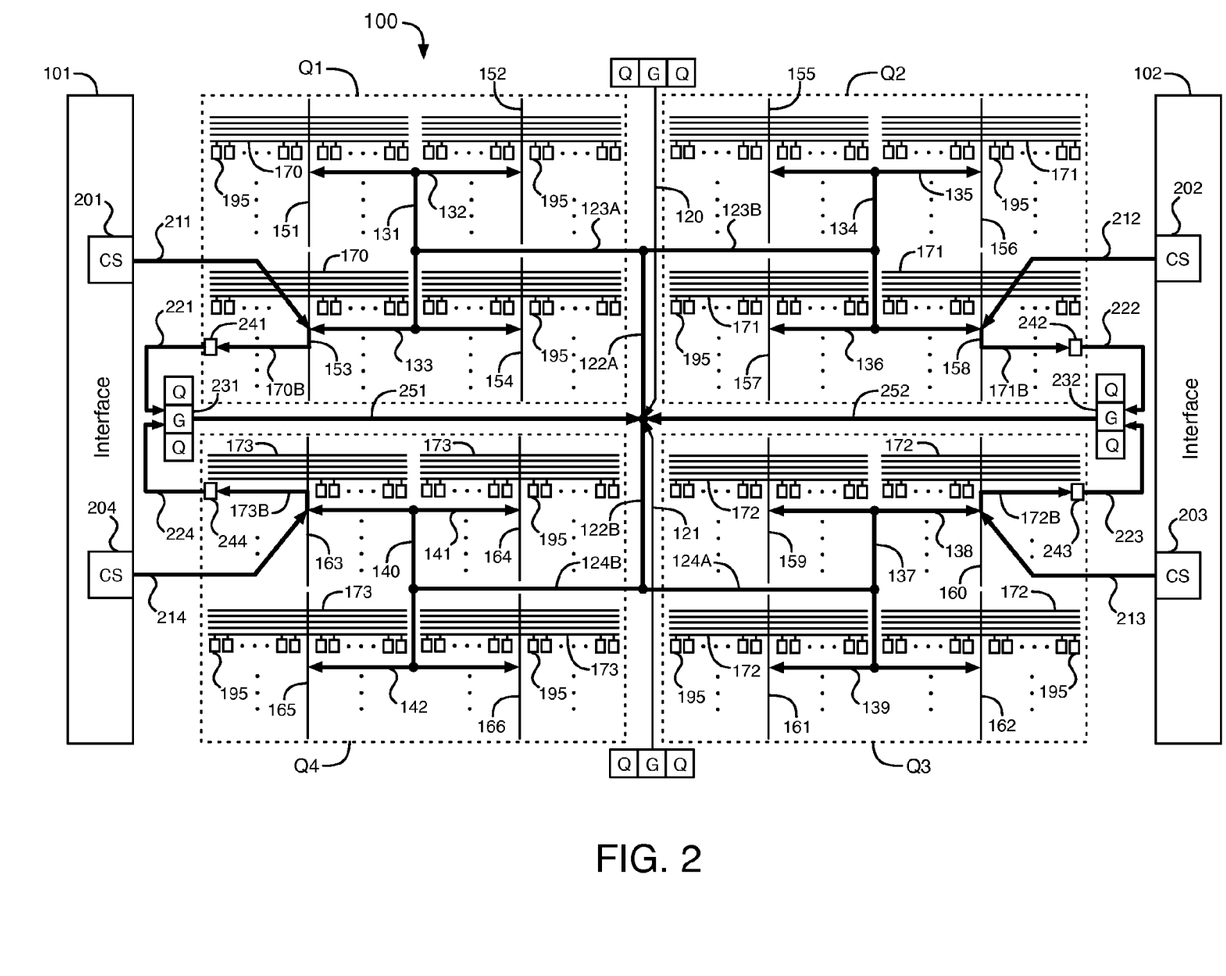
FIG. 2 illustrates a second embodiment of a technique for providing clock signals from an interface circuit through regional and local clock networks to a global clock network on an integrated circuit, according to an embodiment of the present invention.

FIG. 2 illustrates a second embodiment of a technique for providing clock signals from an interface circuit through regional and local clock networks to a global clock network on an integrated circuit, according to an embodiment of the present invention. FIG. 2 illustrates the same integrated circuit 100 shown in FIG. 1.

Integrated circuit 100 in FIG. 2 includes all of the circuitry and conductors in FIG. 1 including interface circuits 101-102, quadrants Q1-Q4 of circuit elements, a global clock network, quadrant clock networks, regional clock networks, and local clock networks. Integrated circuit 100 also includes global clock multiplexers 231, global clock multiplexers 232, dedicated clock lines 221-224, and horizontal input/output interface circuits 241-244, as shown in FIG. 2.

Interface circuit 101 includes clock signal (CS) generation circuits 201 and 204, and interface circuit 102 includes clock signal generation circuits 202 and 203. Clock signal generation circuits 201-204 may include, for example, phase-locked loops and/or delay locked loops.

The global clock network in integrated circuit 100 includes conductors 251-252, 120-121, 122A-122B, 123A-123B, 124A-124B, and 131-142. The regional clock networks include conductors 211-214. The local clock networks include vertical conductors 151-166 and horizontal conductors 170-173. Only a subset of the horizontal conductors 170-173 are shown and identified in FIG. 2 to simplify the drawing. Each of the global, quadrant, regional, and local clock networks includes conductors as well as buffers and/or multiplexers that transmit clock signals between the conductors. In an embodiment of FIG. 2, each of the reference numerals 120, 121, 122A-122B, 123A-123B, 124A-124B, 131-142, 151-166, 170-173, 211-214, 221-224, and 251-252 identifies a line that represents multiple parallel conductors.

The local clock networks in quadrants Q1-Q4 include horizontal conductors 170B, horizontal conductors 171B, horizontal conductors 172B, and horizontal conductors 173B, respectively. Each of the 4 sets of horizontal conductors 170B-173B is a subset of the respective set of horizontal conductors 170-173.

In the embodiment of FIG. 2, clock signals are provided from interface circuits 101-102 through portions of the regional clock networks, portions of the local clock networks, horizontal input/output interface circuits 241-244, dedicated clock lines 221-224, and the global clock multiplexers 231-232 to the global clock network. The clock signals are then provided from the global clock network to circuit elements 195 in each of the quadrants Q1-Q4 through the local clock networks. Portions of the regional, local, and global clock networks and the dedicated clock lines that are used to transmit these clock signals are indicated by thick black lines in FIG. 2.

Each of the 4 clock signal generation circuits 201-204 generates multiple periodic output clock signals. The clock signals generated by clock signal generation circuits 201, 202, 203, and 204 are provided to conductors 211, conductors 212, conductors 213, and conductors 214, respectively, in the regional clock networks.

The clock signals generated by clock signal generation circuits 201, 202, 203 and 204 are provided from conductors 211, 212, 213, and 214 through vertical conductors 153, 158, 160, and 163, through horizontal conductors 170B, 171B, 172B, and 173B, to horizontal input/output interface circuits 241, 242, 243, and 244, respectively. Each of the clock signals generated by clock signal generation circuits 201-204 is provided to a different one of the parallel conductors in the corresponding clock network. Each of the clock signals may be transmitted from one conductor to another conductor in the clock networks using buffers and/or multiplexers.

Horizontal input/output interface circuits 241-244 include multiplexers that select which of the clock signals from conductors 170B, 171B, 172B, and 173B are used to generate the clock signals in dedicated clock lines 221, 222, 223, and 224, respectively. Each of reference numerals 221-224 refers to one clock line or multiple clock lines in parallel, and each of these clock lines may be, for example, a single conductor or multiple conductors connected together in series by buffers. In some embodiments, each of the dedicated clock lines 221-224 has a fixed and non-programmable length that generates a predictable delay in the clock signal transmitted through that clock line. In some embodiments, each of the dedicated clock lines 221-224 has a non-programmable path through integrated circuit 100. Horizontal input/output interface circuits 241, 242, 243, and 244 provide clock signals to conductors 221, 222, 223, and 224 that are generated based on selected clock signals received from conductors 170B, 171B, 172B, and 173B, respectively.

The clock signals in conductors 221 and 224 are provided to inputs of global clock multiplexer circuits 231. Global clock multiplexers 231 are configurable to provide clock signals in conductors 251 in the global clock network based on selecting either the clock signals in conductors 221 or the clock signals in conductors 224. The clock signals in conductors 222 and 223 are provided to inputs of global clock multiplexer circuits 232. Global clock multiplexers 232 are configurable to provide clock signals in conductors 252 in the global clock network based on selecting either the clock signals in conductors 222 or the clock signals in conductors 223.

The clock signals in conductors 251 and the clock signals in conductors 252 are provided to conductors 122A through buffers and/or multiplexers. The clock signals in conductors 251 and the clock signals in conductors 252 are also provided to conductors 122B through buffers and/or multiplexers. The clock signals in conductors 122A are provided to circuit elements 195 in each of quadrants Q1-Q2 through conductors 123A-123B, 131-136, 151-158, and 170-171, as described above with respect to FIG. 1. The clock signals in conductors 122B are provided to circuit elements 195 in each of quadrants Q3-Q4 through conductors 124A-124B, 137-142, 159-166, and 172-173, as described above with respect to FIG. 1. In an exemplary embodiment, the buffers and/or multiplexers that transmit the clock signals between portions of the global clock network are indicated by the dots in FIG. 2.

Figure 3:
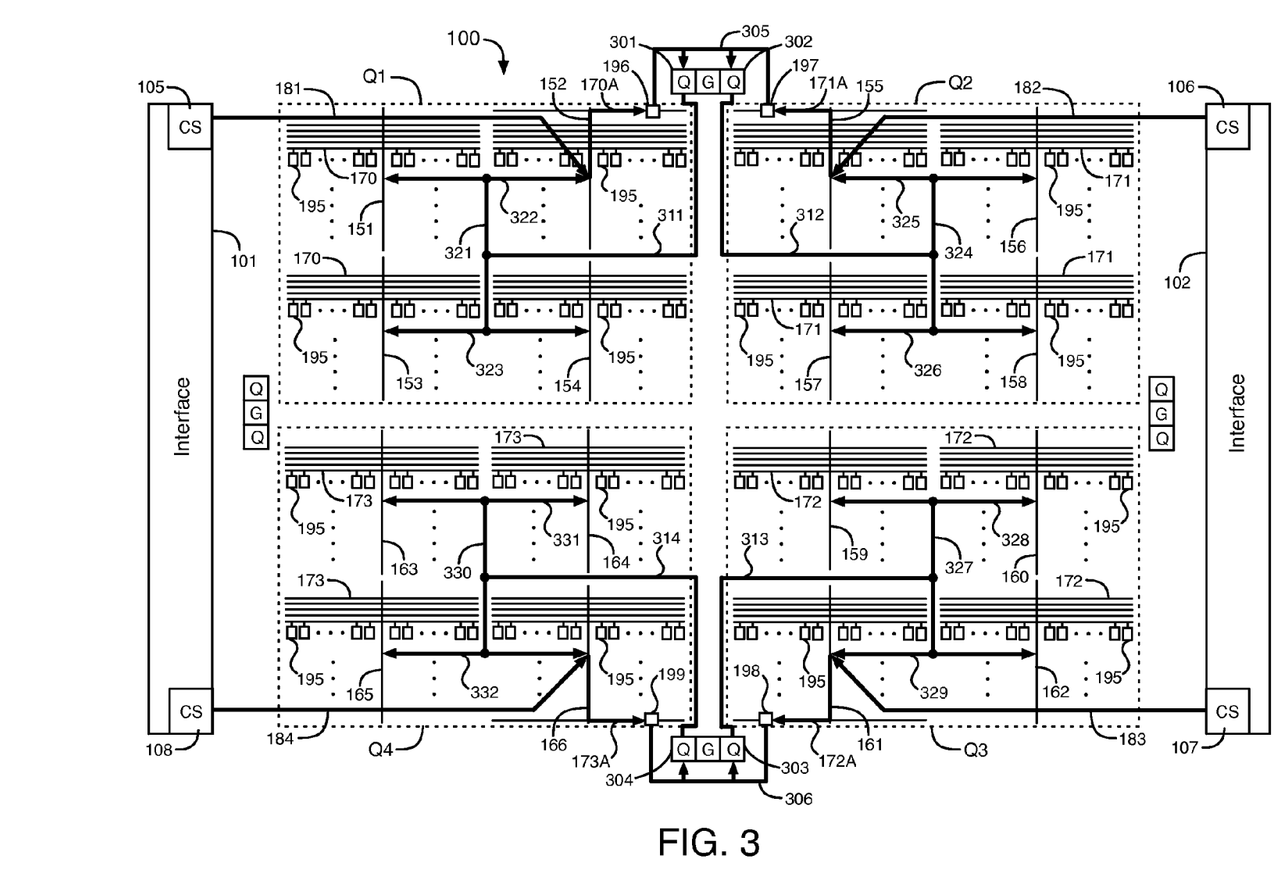
FIG. 3 illustrates a first embodiment of a technique for providing clock signals from an interface circuit through regional and local clock networks to quadrant clock networks on an integrated circuit, according to an embodiment of the present invention.

FIG. 3 illustrates a first embodiment of a technique for providing clock signals from an interface circuit through regional and local clock networks to quadrant clock networks on an integrated circuit, according to an embodiment of the present invention. FIG. 3 illustrates the same integrated circuit 100 shown in FIGS. 1-2.

Integrated circuit 100 as shown in FIG. 3 includes all of the circuitry and conductors shown in FIGS. 1 and 2, including the global clock network, even though some of the circuitry and conductors of FIGS. 1-2 are not shown in FIG. 3. As shown in FIG. 3, integrated circuit 100 also includes quadrant clock multiplexers 301-304, dedicated clock lines 305-306, conductors 311-314, and conductors 321-332. The quadrant clock network for quadrant Q1 includes conductors 311 and 321-323. The quadrant clock network for quadrant Q2 includes conductors 312 and 324-326. The quadrant clock network for quadrant Q3 includes conductors 313 and 327-329. The quadrant clock network for quadrant Q4 includes conductors 314 and 330-332. In an embodiment of FIG. 3, each of the reference numerals 305-306, 311-314, 321-332, 151-166, 170-173, and 181-184 points to a line that represents multiple parallel conductors.

In the embodiment of FIG. 3, clock signals are provided from interface circuits 101-102 through portions of the regional clock networks, portions of the local clock networks, vertical input/output interface circuits 196-199, dedicated clock lines 305-306, and the quadrant clock multiplexers 301-304 to the quadrant clock networks. The clock signals are then provided from the quadrant clock networks to circuit elements 195 in quadrants Q1-Q4 through the local clock networks. Portions of the regional, local, and quadrant clock networks and the dedicated clock lines that are used to transmit these clock signals are indicated by thick black lines in FIG. 3.

In the embodiment of FIG. 3, the clock signals generated by clock signal generation circuits 105-108 are provided to vertical input/output interface circuits 196-199 via conductors 181-184, conductors 152, 155, 161, and 166, and conductors 170A, 171A, 172A, and 173A, respectively. Vertical input/output interface circuits 196 and 197 include multiplexer circuits that select clock signals received from conductors 170A and 171A, respectively, to generate clock signals in dedicated clock lines 305. Vertical input/output interface circuits 196 and 197 may also include buffer circuits. Dedicated clock lines 305 include enough parallel conductors for each of the clock signals generated by vertical input/output interface circuits 196 and 197.

Vertical input/output interface circuits 198 and 199 include multiplexer circuits that select clock signals received from conductors 172A and 173A, respectively, to generate buffered clock signals in dedicated clock lines 306. Vertical input/output interface circuits 198-199 may also include buffer circuits. Dedicated clock lines 306 include enough parallel conductors for each of the clock signals generated by vertical input/output interface circuits 198 and 199. In some embodiments, each of the dedicated clock lines 305 and each of the dedicated clock lines 306 has a fixed and non-programmable length through integrated circuit 100 to generate a predictable delay in the clock signal transmitted through that clock line. In some embodiments, each of the dedicated clock lines 305 and each of the dedicated clock lines 306 also has a non-programmable path through integrated circuit 100. Each of reference numerals 305-306 refers to one clock line or multiple clock lines in parallel, and each of these clock lines may be, for example, a single conductor or multiple conductors connected together in series by buffers.

The clock signals in conductors 305 are provided to inputs of both sets of quadrant clock multiplexer circuits 301-302. Quadrant clock multiplexer circuits 301 are configurable to transmit the clock signals in conductors 305 in parallel to conductors 311 in the quadrant clock network of Q1. Quadrant clock multiplexer circuits 301 provide the clock signals received from both of interface circuits 196-197 to conductors 311. Quadrant clock multiplexer circuits 302 are configurable to transmit the clock signals in conductors 305 in parallel to conductors 312 in the quadrant clock network of Q2. Quadrant clock multiplexer circuits 302 provide the clock signals received from both of interface circuits 196-197 to conductors 312.

The clock signals in conductors 306 are provided to inputs of both sets of quadrant clock multiplexer circuits 303-304. Quadrant clock multiplexer circuits 303 are configurable to transmit the clock signals in conductors 306 in parallel to conductors 313 in the quadrant clock network of Q3. Quadrant clock multiplexer circuits 303 provide the clock signals received from both of interface circuits 198-199 to conductors 313. Quadrant clock multiplexer circuits 304 are configurable to transmit the clock signals in conductors 306 in parallel to conductors 314 in the quadrant clock network of Q4. Quadrant clock multiplexer circuits 304 provide the clock signals received from both of interface circuits 198-199 to conductors 314.

The clock signals in conductors 311, conductors 312, conductors 313, and conductors 314 are provided to conductors 321, conductors 324, conductors 327, and conductors 330, respectively, using buffers and/or multiplexers. The clock signals in conductors 321, conductors 324, conductors 327, and conductors 330 are provided to conductors 322-323, conductors 325-326, conductors 328-329, and conductors 331-332, respectively, using buffers and/or multiplexers. In an exemplary embodiment, the buffers and/or multiplexers that transmit the clock signals between portions of the quadrant clock networks are indicated by the dots in FIG. 3.

The clock signals in conductors 322, 323, 325, 326, 328, 329, 331, and 332 are provided to vertical conductors 151-152, 153-154, 155-156, 157-158, 159-160, 161-162, 163-164, and 165-166, respectively, using buffers and/or multiplexers. The clock signals in vertical conductors 151-154, 155-158, 159-162, and 163-166 are provided to horizontal conductors 170-173, respectively, in quadrants Q1-Q4. The clock signals in horizontal conductors 170-173 are provided to circuit elements 195, as described above.

Figure 4:
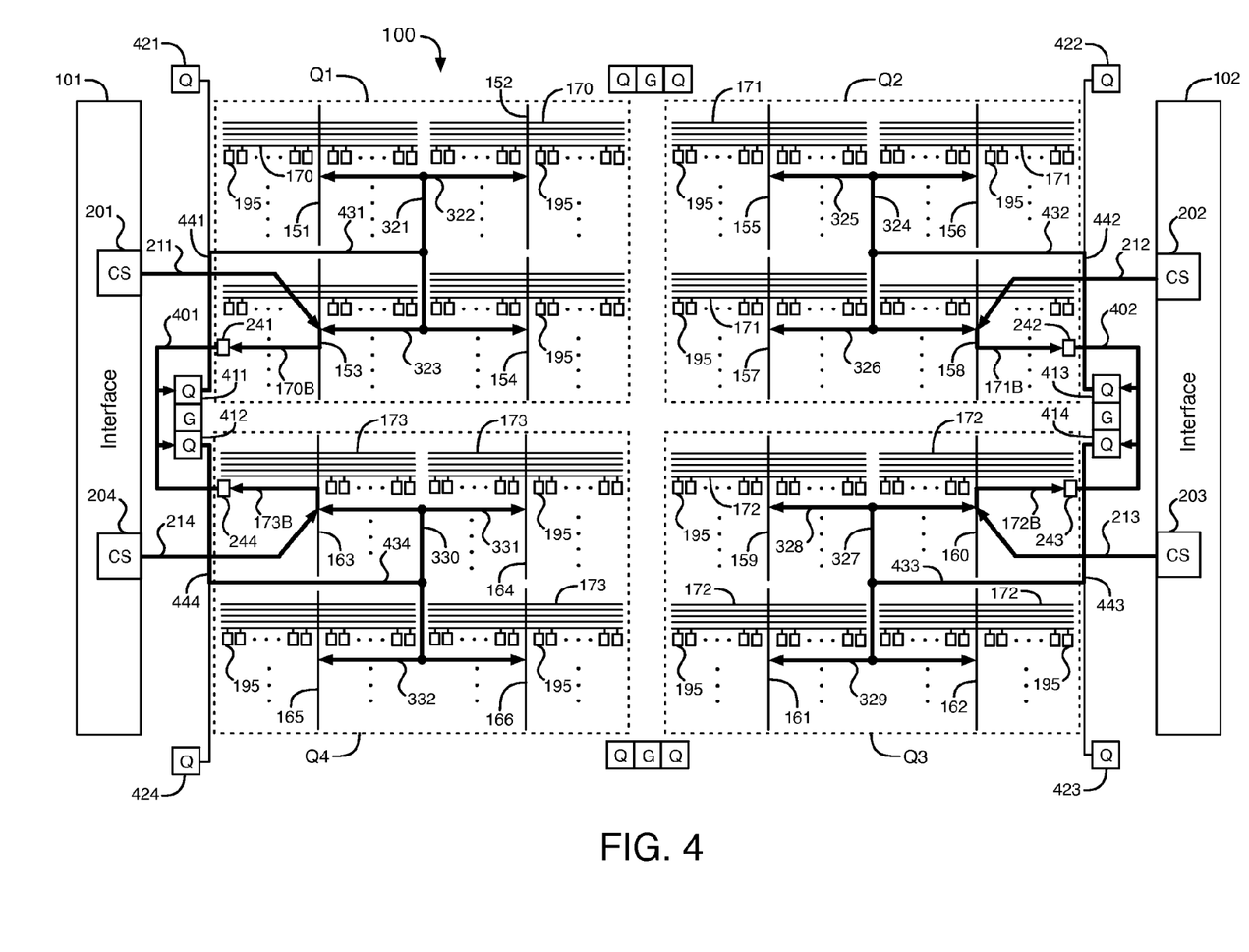
FIG. 4 illustrates a second embodiment of a technique for providing clock signals from an interface circuit through regional and local clock networks to quadrant clock networks on an integrated circuit, according to an embodiment of the present invention.

FIG. 4 illustrates a second embodiment of a technique for providing clock signals from an interface circuit through regional and local clock networks to quadrant clock networks on an integrated circuit, according to an embodiment of the present invention. FIG. 4 illustrates the same integrated circuit 100 shown in FIGS. 1-3.

Integrated circuit 100 as shown in FIG. 4 includes all of the circuitry and conductors in FIGS. 1-3, including the global clock network, even though some of the circuitry and conductors of FIGS. 1-3 are not shown in FIG. 4. As shown in FIG. 4, integrated circuit 100 also includes dedicated clock lines 401-402, quadrant clock multiplexers 411-414, quadrant clock multiplexers 421-424, conductors 431-434, and conductors 441-444. The quadrant clock networks for quadrants Q1-Q4 include conductors 431-434 and 441-444, respectively. In an embodiment of FIG. 4, each of the reference numerals 401-402, 431-434, 441-444, 321-332, 151-166, and 170-173 points to a line that represents multiple parallel conductors.

In the embodiment of FIG. 4, clock signals are provided from interface circuits 101-102 through portions of the regional clock networks, portions of the local clock networks, horizontal input/output interface circuits 241-244, dedicated clock lines 401-402, and the quadrant clock multiplexers 411-414 to the quadrant clock networks. The clock signals are then provided from the quadrant clock networks to circuit elements 195 in quadrants Q1-Q4 through the local clock networks. Portions of the regional, local, and quadrant clock networks and the dedicated clock lines that are used to transmit these clock signals are indicated by thick black lines in FIG. 4.

In the embodiment of FIG. 4, clock signals generated by clock signal generation circuits 201, 202, 203 and 204 are provided to horizontal input/output interface circuits 241, 242, 243, and 244 via conductors 211, 212, 213, and 214 in the regional clock network, vertical conductors 153, 158, 160, and 163, and horizontal conductors 170B, 171B, 172B, and 173B, respectively. Each of the clock signals is provided to a different one of the parallel conductors in the corresponding clock network. Each of the clock signals may be transmitted from one conductor to another conductor in the clock networks using buffers and/or multiplexers.

Multiplexer circuits in horizontal input/output interface circuits 241 and 244 select clock signals received from conductors 170B and 173B, respectively, to generate clock signals in dedicated clock lines 401. Dedicated clock lines 401 include enough parallel conductors for each of the clock signals received from horizontal input/output interface circuits 241 and 244. Multiplexer circuits in horizontal input/output interface circuits 242 and 243 select clock signals received from conductors 171B and 172B, respectively, to generate clock signals in dedicated clock lines 402. Dedicated clock lines 402 include enough parallel conductors for each of the clock signals received from horizontal input/output interface circuits 242 and 243.

In some embodiments, each of the dedicated clock lines 401 and 402 has a fixed, non-programmable length to generate a predictable delay in the clock signal transmitted through that clock line. In some embodiments, each of the dedicated clock lines 401 and 402 has a non-programmable path through integrated circuit 100. Each of reference numerals 401-402 refers to one clock line or multiple clock lines in parallel, and each of these clock lines may be, for example, a single conductor or multiple conductors connected together in series by buffers. Horizontal input/output interface circuits 241, 242, 243, and 244 transmit each of the clock signals generated from a clock signal received from one of the conductors 170B, 171B, 172B, and 173B, respectively, to a different one of the clock lines 401 or 402.

The clock signals in clock lines 401 are provided to inputs of both sets of quadrant clock multiplexer circuits 411-412. Quadrant clock multiplexer circuits 411 are configurable to provide the clock signals in conductors 401 in parallel to conductors 441 in the quadrant clock network of Q1. Quadrant clock multiplexer circuits 411 are configurable to provide the clock signals received from both of interface circuits 241 and 244 to conductors 441. Conductors 441 are coupled to quadrant clock multiplexers 411 and 421.

Quadrant clock multiplexer circuits 412 are configurable to provide the clock signals in conductors 401 in parallel to conductors 444 in the quadrant clock network of Q4. Quadrant clock multiplexer circuits 412 are configurable to provide the clock signals received from both of interface circuits 241 and 244 to conductors 444. Conductors 444 are coupled to quadrant clock multiplexers 412 and 424.

The clock signals in clock lines 402 are provided to inputs of both sets of quadrant clock multiplexer circuits 413-414. Quadrant clock multiplexer circuits 413 are configurable to provide the clock signals in clock lines 402 in parallel to conductors 442 in the quadrant clock network of Q2. Quadrant clock multiplexer circuits 413 are configurable to provide the clock signals received from both of interface circuits 242 and 243 to conductors 442. Conductors 442 are coupled to quadrant clock multiplexers 413 and 422.

Quadrant clock multiplexer circuits 414 are configurable to provide the clock signals in clock lines 402 in parallel to conductors 443 in the quadrant clock network of Q3. Quadrant clock multiplexer circuits 414 are configurable to provide the clock signals received from both of interface circuits 242 and 243 to conductors 443. Conductors 443 are coupled to quadrant clock multiplexers 414 and 423.

The clock signals in conductors 441, conductors 442, conductors 443, and conductors 444 are transmitted to conductors 431, conductors 432, conductors 433, and conductors 434, respectively. The clock signals in conductors 431, conductors 432, conductors 433, and conductors 434 are provided to conductors 321, conductors 324, conductors 327, and conductors 330, respectively, using buffers and/or multiplexers. The clock signals in conductors 321, conductors 324, conductors 327, and conductors 330 are provided to conductors 322-323, conductors 325-326, conductors 328-329, and conductors 331-332, respectively, using buffers and/or multiplexers. The clock signals in conductors 322, 323, 325, 326, 328, 329, 331, and 332 are provided to circuit elements 195 through the local clock network in each quadrant Q1-Q4, as described above.

Figure 5:
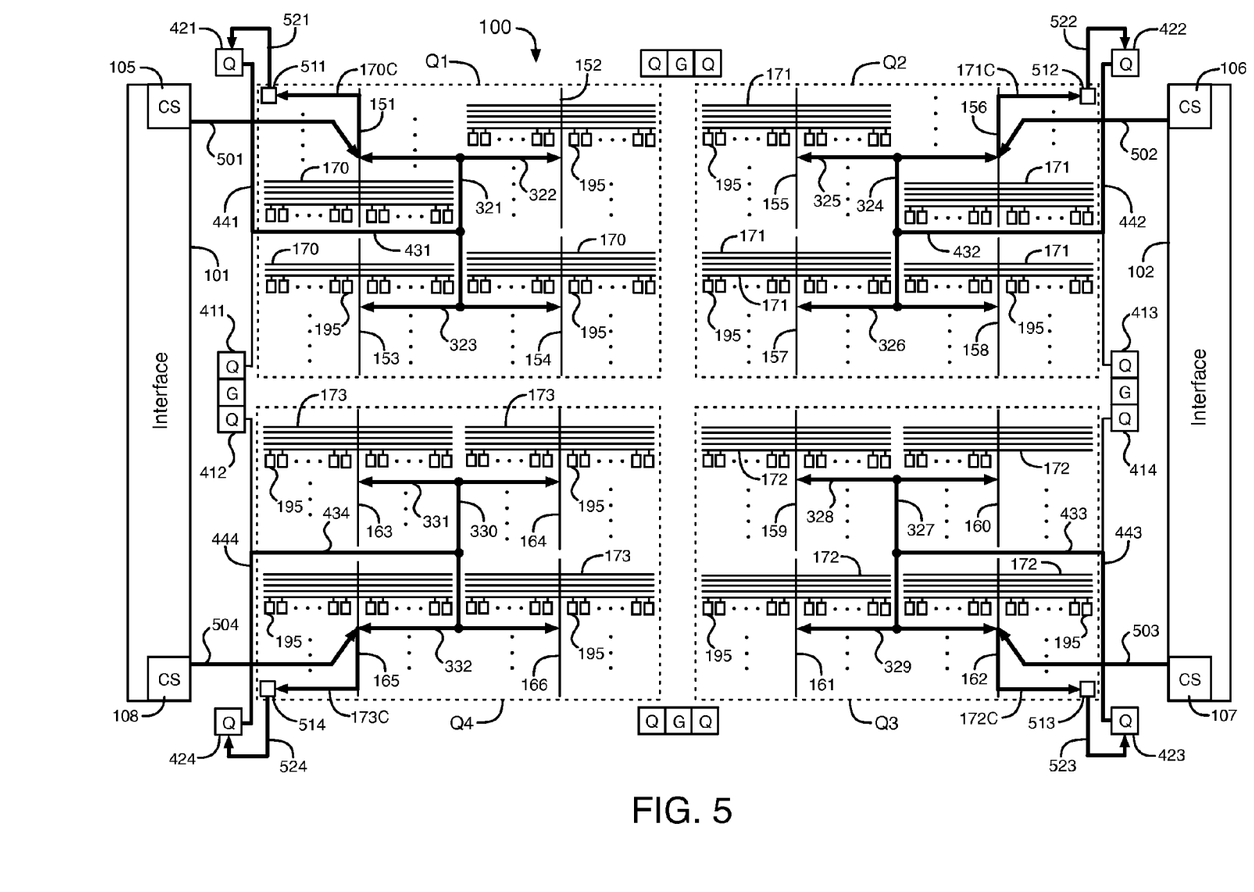
FIG. 5 illustrates a third embodiment of a technique for providing clock signals from an interface circuit through regional and local clock networks to quadrant clock networks on an integrated circuit, according to an embodiment of the present invention.

FIG. 5 illustrates a third embodiment of a technique for providing clock signals from an interface circuit through regional and local clock networks to quadrant clock networks on an integrated circuit, according to an embodiment of the present invention. FIG. 5 illustrates the same integrated circuit 100 shown in FIGS. 1-4.

Integrated circuit 100 as shown in FIG. 5 includes all of the circuitry and conductors in FIGS. 1-4 including all of the global and quadrant clock networks, even though some of the circuitry and conductors of FIGS. 1-4 are not shown in FIG. 5. As shown in FIG. 5, integrated circuit 100 also includes dedicated clock lines 521-524 and horizontal input/output interface circuits 511-514. In an embodiment of FIG. 5, each of the reference numerals 521-524, 431-434, 441-444, 321-332, 151-166, and 170-173 points to a line that represents multiple parallel conductors.

In the embodiment of FIG. 5, clock signals are provided from interface circuits 101-102 through portions of the regional clock networks, portions of the local clock networks, horizontal input/output interface circuits 511-514, dedicated clock lines 521-524, and the quadrant clock multiplexers 421-424 to the quadrant clock networks. The clock signals are then provided from the quadrant clock networks to circuit elements 195 in quadrants Q1-Q4 through the local clock networks. Portions of the regional, local, and quadrant clock networks and the dedicated clock lines that are used to transmit these clock signals are indicated by thick black lines in FIG. 5.

In the embodiment of FIG. 5, clock signal generation circuits 105, 106, 107, and 108 generate clock signals that are provided to conductors 501, conductors 502, conductors 503, and conductors 504, respectively, in the regional clock networks. These clock signals generated by clock signal generation circuits 105, 106, 107, and 108 are provided from conductors 501, 502, 503, and 504 to vertical conductors 151, 156, 162, and 165, respectively, using buffers and/or multiplexers. Each of the clock signals in conductors 501-504 is transmitted to a different one of the respective conductors 151, 156, 162, and 165.

The local clock networks in quadrants Q1-Q4 include horizontal conductors 170C, horizontal conductors 171C, horizontal conductors 172C, and horizontal conductors 173C, respectively. Each of the 4 sets of horizontal conductors 170C-173C is a respective subset of one set of horizontal conductors 170-173.

The clock signals generated by clock signal generation circuits 105, 106, 107, and 108 are provided to inputs of horizontal input/output interface circuits 511, 512, 513, and 514 via conductors 501, 502, 503, and 504 in the regional clock network, vertical conductors 151, 156, 162, and 165, and horizontal conductors 170C, 171C, 172C, and 173C, respectively. Each of the clock signals generated by clock signal generation circuits 105-108 is provided to a different conductor in the respective clock network using, for example, a buffer and/or a multiplexer.

Horizontal input/output interface circuits 511, 512, 513, and 514 include multiplexer circuits that select clock signals received from conductors 170C, 171C, 172C, and 173C to generate clock signals in dedicated clock lines 521, 522, 523, and 524, respectively. In some embodiments, each of the dedicated clock lines 521-524 has a fixed, non-programmable length to generate a predictable delay in a clock signal transmitted through that clock line. In some embodiments, each of the dedicated clock lines 521-524 has a non-programmable path through integrated circuit 100. Each of reference numerals 521-524 refers to a single clock line or multiple clock lines in parallel, and each of these clock lines may be, for example, a single conductor or multiple conductors connected together in series by buffers.

Horizontal input/output interface circuits 511, 512, 513, and 514 transmit each of the clock signals to a different one of the dedicated clock lines 521, 522, 523, and 524, respectively. The clock signals in dedicated clock lines 521, 522, 523, and 524 are provided to inputs of quadrant clock multiplexer circuits 421, 422, 423, and 424, respectively.

Quadrant clock multiplexer circuits 421, 422, 423, and 424 are configurable to provide the clock signals in clock lines 521, 522, 523, and 524 to conductors 441, 442, 443, and 444, respectively, in the quadrant clock networks. The clock signals in conductors 441-444 are provided to conductors 431-434, respectively, using buffers and/or multiplexers. The clock signals in conductors 431-434 are provided to conductors 321, 324, 327, and 330, respectively, using buffers and/or multiplexers. The clock signals in conductors 321, 324, 327, and 330 are provided to conductors 322-323, 325-326, 328-329, and 331-332, respectively, using buffers and/or multiplexers. The clock signals in conductors 322, 323, 325, 326, 328, 329, 331, and 332 are provided to circuit elements 195 through the local clock network in each quadrant Q1-Q4, as described above.

Figure 6:
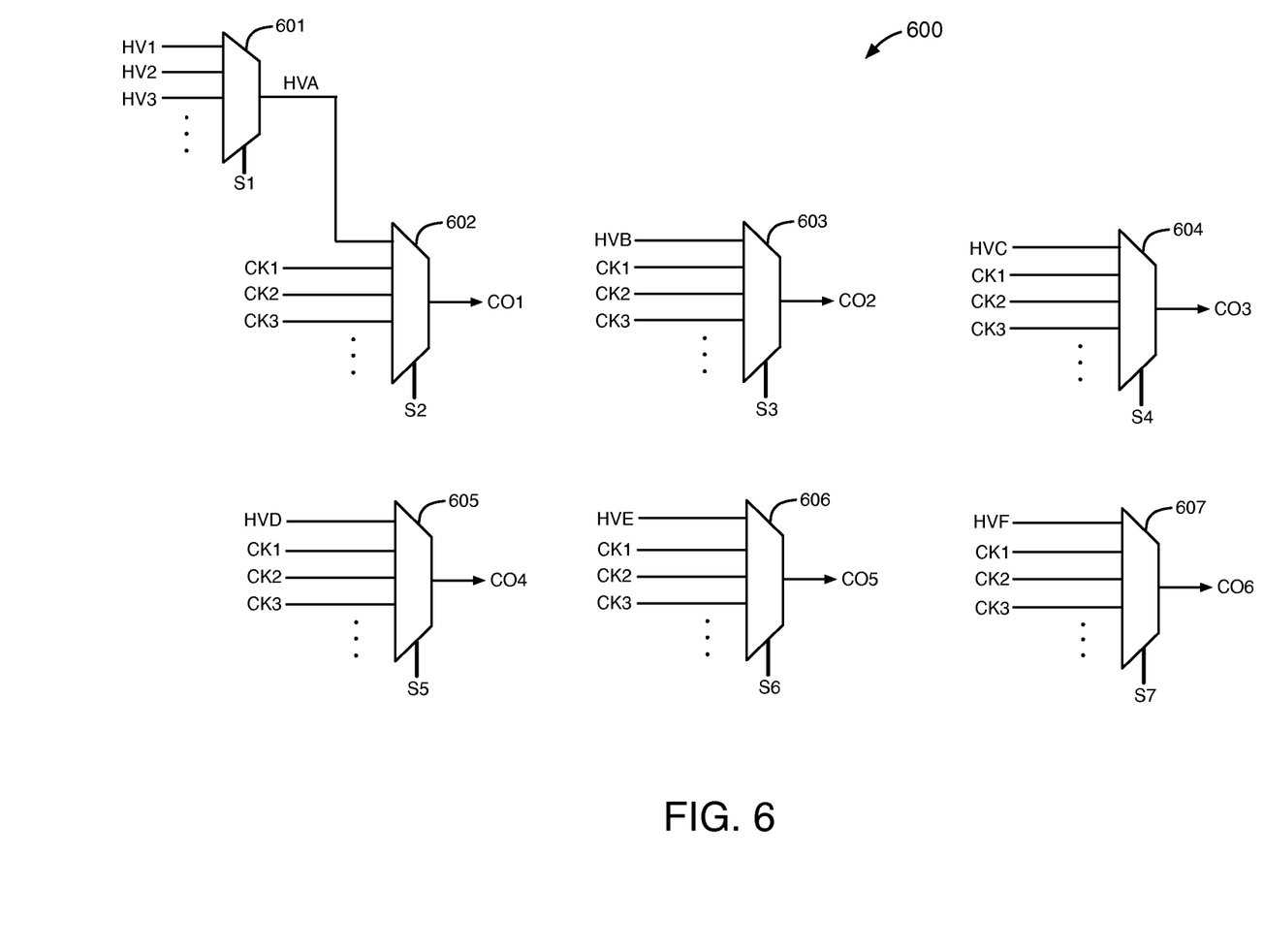
FIG. 6 illustrates an example of the horizontal and vertical input/output interface circuits shown in FIGS. 1-5, according to an embodiment of the present invention.

FIG. 6 illustrates an example of the horizontal and vertical input/output interface circuits shown in FIGS. 1-5, according to an embodiment of the present invention. Input/output interface circuit 600 shown in FIG. 6 is an example of circuitry in each of the vertical input/output interface circuits 196-199 shown in FIGS. 1 and 3. Input/output interface circuit 600 is also an example of circuitry in each of the horizontal input/output interface circuits 241-244 shown in FIGS. 2 and 4. Input/output interface circuit 600 is also an example of circuitry in each of the horizontal input/output interface circuits 511-514 shown in FIG. 5.

Input/output interface circuit 600 includes multiplexer circuits 601-607. Signals generated by circuit elements 195, including signals HV1, HV2, and HV3, are provided to multiplexing inputs of multiplexer circuit 601. Any number of signals generated by circuit elements 195 can be provided to multiplexing inputs of multiplexer circuit 601. Three signals HV1, HV2, and HV3 are shown in FIG. 6 as an example. Signals HV1, HV2, HV3, etc. are generated in circuit elements 195 and provided to the multiplexing inputs of multiplexer circuit 601 through programmable vertical and horizontal routing conductors and multiplexers.

Select signals 51 are provided to select inputs of multiplexer circuit 601. Multiplexer circuit 601 generates an output signal HVA at its output. Multiplexer circuit 601 selects one of the signals HV1, HV2, HV3, etc. at its multiplexing inputs as a selected signal based on the logic states of select signals 51 and provides the selected signal as output signal HVA.

Output signal HVA is provided to a multiplexing input of multiplexer circuit 602. Signals HVB, HVC, HVD, HVE, and HVF are provided to multiplexing inputs of multiplexer circuits 603-607, respectively. Signals HVB, HVC, HVD, HVE, and HVF are generated in circuit elements 195 and provided to multiplexing inputs of multiplexer circuits 603-607, respectively, through programmable vertical and horizontal routing conductors and multiplexers.

Clock signals, including clock signals CK1, CK2, CK3, etc., from a subset of the horizontal conductors 170, 171, 172, or 173 in the corresponding local clock network are provided to multiplexing inputs of each of multiplexer circuits 602-607, as shown in FIG. 6. Any number of clock signals (e.g., 2, 3, 4, 5, 6, 10, 20, etc.) from the local clock network can be provided to multiplexing inputs of each of multiplexer circuits 602-607. Three clock signals CK1, CK2, and CK3 are shown in FIG. 6 as an example.

Select signals S2-S7 are provided to select inputs of multiplexer circuits 602-607, respectively. Multiplexer circuits 602-607 generate output signals CO1, CO2, CO3, CO4, CO5, and CO6 at their respective outputs. Each of multiplexer circuits 602-607 selects one of the signals at its multiplexing inputs as a selected signal based on a respective set of select signals S2-S7 and provides the selected signal as a respective output signal CO1-CO6.

Multiplexer circuits 602-604 in vertical input/output interface circuit 196 are configurable to provide 3 of clock signals CK1, CK2, CK3, etc. from horizontal conductors 170A to the global clock multiplexers 111 through dedicated conductors 190 as clock signals CO1-CO3. Multiplexer circuits 605-607 in vertical input/output interface circuit 196 are configurable to provide 3 of clock signals CK1, CK2, CK3, etc. from horizontal conductors 170A to the quadrant clock multiplexers 301-302 through a subset of dedicated conductors 305 as clock signals CO4-CO6.

Multiplexer circuits 602-604 in vertical input/output interface circuit 197 are configurable to provide 3 of clock signals CK1, CK2, CK3, etc. from horizontal conductors 171A to the global clock multiplexers 111 through dedicated conductors 191 as clock signals CO1-CO3. Multiplexer circuits 605-607 in vertical input/output interface circuit 197 are configurable to provide 3 of clock signals CK1, CK2, CK3, etc. from horizontal conductors 171A to the quadrant clock multiplexers 301-302 through a subset of dedicated conductors 305 as clock signals CO4-CO6.

Multiplexer circuits 602-604 in vertical input/output interface circuit 198 are configurable to provide 3 of clock signals CK1, CK2, CK3, etc. from horizontal conductors 172A to the global clock multiplexers 112 through dedicated conductors 192 as clock signals CO1-CO3. Multiplexer circuits 605-607 in vertical input/output interface circuit 198 are configurable to provide 3 of clock signals CK1, CK2, CK3, etc. from horizontal conductors 172A to the quadrant clock multiplexers 303-304 through a subset of dedicated conductors 306 as clock signals CO4-CO6.

Multiplexer circuits 602-604 in vertical input/output interface circuit 199 are configurable to provide 3 of clock signals CK1, CK2, CK3, etc. from horizontal conductors 173A to the global clock multiplexers 112 through dedicated conductors 193 as clock signals CO1-CO3. Multiplexer circuits 605-607 in vertical input/output interface circuit 199 are configurable to provide 3 of clock signals CK1, CK2, CK3, etc. from horizontal conductors 173A to the quadrant clock multiplexers 303-304 through a subset of dedicated conductors 306 as clock signals CO4-CO6.

Multiplexer circuits 602-604 in horizontal input/output interface circuit 241 are configurable to provide 3 of clock signals CK1, CK2, CK3, etc. from horizontal conductors 170B to the global clock multiplexers 231 through dedicated conductors 221 as clock signals CO1-CO3. Multiplexer circuits 605-607 in horizontal input/output interface circuit 241 are configurable to provide 3 of clock signals CK1, CK2, CK3, etc. from horizontal conductors 170B to the quadrant clock multiplexers 411-412 through a subset of dedicated conductors 401 as clock signals CO4-CO6.

Multiplexer circuits 602-604 in horizontal input/output interface circuit 242 are configurable to provide 3 of clock signals CK1, CK2, CK3, etc. from horizontal conductors 171B to the global clock multiplexers 232 through dedicated conductors 222 as clock signals CO1-CO3. Multiplexer circuits 605-607 in horizontal input/output interface circuit 242 are configurable to provide 3 of clock signals CK1, CK2, CK3, etc. from horizontal conductors 171B to the quadrant clock multiplexers 413-414 through a subset of dedicated conductors 402 as clock signals CO4-CO6.

Multiplexer circuits 602-604 in horizontal input/output interface circuit 243 are configurable to provide 3 of clock signals CK1, CK2, CK3, etc. from horizontal conductors 172B to the global clock multiplexers 232 through dedicated conductors 223 as clock signals CO1-CO3. Multiplexer circuits 605-607 in horizontal input/output interface circuit 243 are configurable to provide 3 of clock signals CK1, CK2, CK3, etc. from horizontal conductors 172B to the quadrant clock multiplexers 413-414 through a subset of dedicated conductors 402 as clock signals CO4-CO6.

Multiplexer circuits 602-604 in horizontal input/output interface circuit 244 are configurable to provide 3 of clock signals CK1, CK2, CK3, etc. from horizontal conductors 173B to the global clock multiplexers 231 through dedicated conductors 224 as clock signals CO1-CO3. Multiplexer circuits 605-607 in horizontal input/output interface circuit 244 are configurable to provide 3 of clock signals CK1, CK2, CK3, etc. from horizontal conductors 173B to the quadrant clock multiplexers 411-412 through a subset of dedicated conductors 401 as clock signals CO4-CO6.

Multiplexer circuits 602-607 in horizontal input/output interface circuit 511 are configurable to provide 6 of clock signals CK1, CK2, CK3, etc. from horizontal conductors 170C to the quadrant clock multiplexers 421 through dedicated conductors 521. Multiplexer circuits 602-607 in horizontal input/output interface circuit 512 are configurable to provide 6 of clock signals CK1, CK2, CK3, etc. from horizontal conductors 171C to the quadrant clock multiplexers 422 through dedicated conductors 522. Multiplexer circuits 602-607 in horizontal input/output interface circuit 513 are configurable to provide 6 of clock signals CK1, CK2, CK3, etc. from horizontal conductors 172C to the quadrant clock multiplexers 423 through dedicated conductors 523. Multiplexer circuits 602-607 in horizontal input/output interface circuit 514 are configurable to provide 6 of clock signals CK1, CK2, CK3, etc. from horizontal conductors 173C to the quadrant clock multiplexers 424 through dedicated conductors 524.

Figure 7:
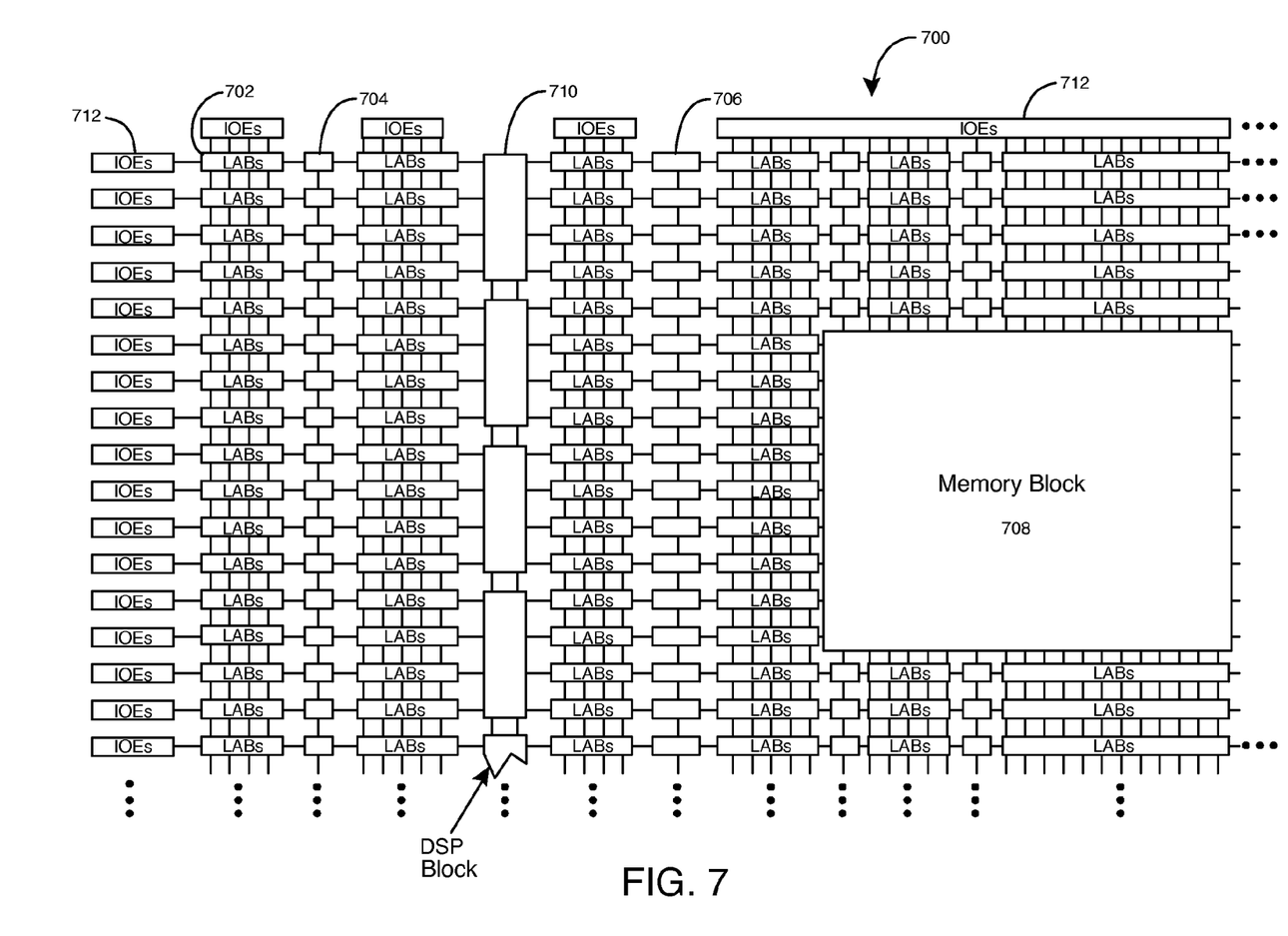
FIG. 7 is a simplified partial block diagram of a field programmable gate array (FPGA) that can include aspects of the present invention.

FIG. 7 is a simplified partial block diagram of a field programmable gate array (FPGA) 700 that can include aspects of the present invention. FPGA 700 is merely one example of an integrated circuit that can include features of the present invention. It should be understood that embodiments of the present invention can be used in numerous types of integrated circuits such as field programmable gate arrays (FPGAs), programmable logic devices (PLDs), complex programmable logic devices (CPLDs), programmable logic arrays (PLAs), application specific integrated circuits (ASICs), memory integrated circuits, central processing units, microprocessors, analog integrated circuits, etc.

FPGA 700 includes a two-dimensional array of programmable logic array blocks (or LABs) 702 that are interconnected by a network of column and row interconnect conductors of varying length and speed. LABs 702 include multiple (e.g., 10) logic elements (or LEs). Circuit elements 195 in FIGS. 1-5 may include LABs.

A logic element (LE) is a programmable logic circuit block that provides for efficient implementation of user defined logic functions. An FPGA has numerous logic elements that can be configured to implement various combinatorial and sequential functions. The logic elements have access to a programmable interconnect structure that includes vertical and horizontal conductors connected by programmable logic connections. The programmable interconnect structure can be programmed to interconnect the logic elements in almost any desired configuration.

FPGA 700 also includes a distributed memory structure including random access memory (RAM) blocks of varying sizes provided throughout the array. The RAM blocks include, for example, blocks 704, blocks 706, and block 708.

These memory blocks can also include shift registers and first-in-first-out (FIFO) buffers.

FPGA 700 further includes digital signal processing (DSP) blocks 710 that can implement, for example, multipliers with add or subtract features. Input/output elements (IOEs) 712 support numerous single-ended and differential input/output standards. IOEs 712 include input and output buffers that are coupled to pins of the integrated circuit. The pins are external terminals of the FPGA die that can be used to route, for example, input signals, output signals, and supply voltages between the FPGA and one or more external devices. FPGA 700 is described herein for illustrative purposes. Embodiments of the present invention can be implemented in many different types of integrated circuits.

Figure 8:
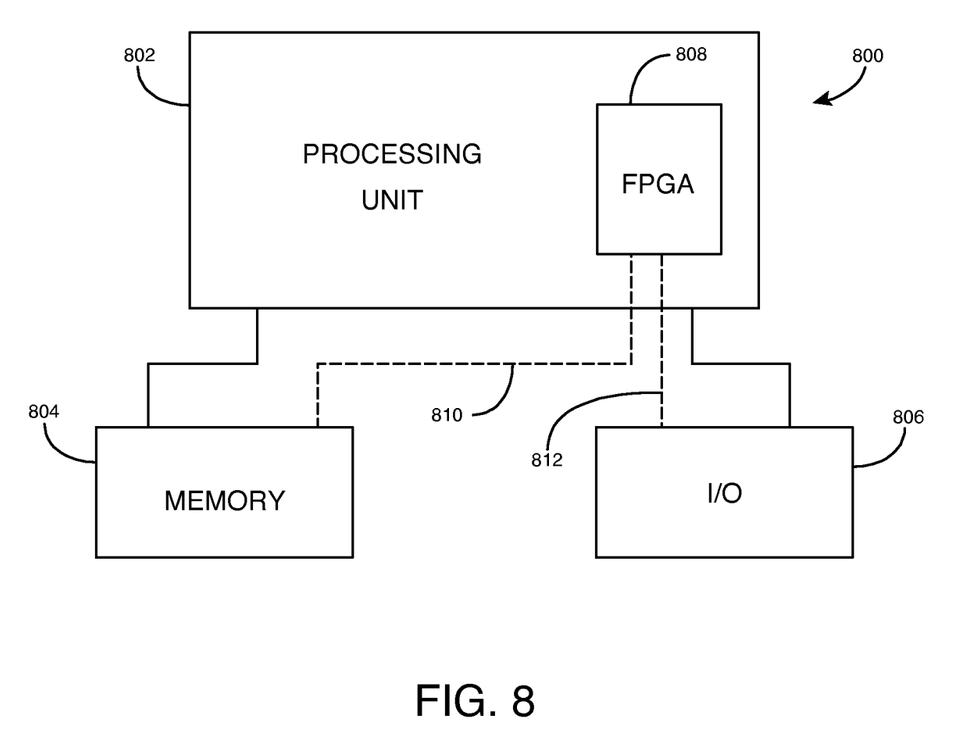
FIG. 8 shows a block diagram of an exemplary digital system that can embody techniques of the present invention.

The present invention can also be implemented in a system that has an FPGA as one of several components. FIG. 8 shows a block diagram of an exemplary digital system 800 that can embody techniques of the present invention. System 800 can be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 800 can be provided on a single board, on multiple boards, or within multiple enclosures.

System 800 includes a processing unit 802, a memory unit 804, and an input/output (I/O) unit 806 interconnected together by one or more buses. According to this exemplary embodiment, an FPGA 808 is embedded in processing unit 802. FPGA 808 can serve many different purposes within the system of FIG. 8. FPGA 808 can, for example, be a logical building block of processing unit 802, supporting its internal and external operations. FPGA 808 is programmed to implement the logical functions necessary to carry on its particular role in system operation. FPGA 808 can be specially coupled to memory 804 through connection 810 and to I/O unit 806 through connection 812.

Processing unit 802 can direct data to an appropriate system component for processing or storage, execute a program stored in memory 804, receive and transmit data via I/O unit 806, or other similar functions. Processing unit 802 can be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 808 can control the logical operations of the system. As another example, FPGA 808 acts as a reconfigurable processor that can be reprogrammed as needed to handle a particular computing task. Alternatively, FPGA 808 can itself include an embedded microprocessor. Memory unit 804 can be a random access memory (RAM), read only memory (ROM), fixed or flexible disk media, flash memory, tape, or any other storage means, or any combination of these storage means.

The foregoing description of the exemplary embodiments of the present invention has been presented for the purposes of illustration and description. The foregoing description is not intended to be exhaustive or to limit the present invention to the examples disclosed herein. In some instances, features of the present invention can be employed without a corresponding use of other features as set forth. Many modifications, substitutions, and variations are possible in light of the above teachings, without departing from the scope of the present invention.

What is claimed is:

1. An integrated circuit comprising:
a first local clock network to provide a first clock signal;
a first interface circuit coupled to receive the first clock signal from the first local clock network and to generate a second clock signal based on the first clock signal;
a first clock line coupled to the first interface circuit;
a first multiplexer circuit, wherein the second clock signal is provided to the first multiplexer circuit through the first clock line, and the first multiplexer circuit provides a third clock signal based on the second clock signal; and
a second clock network coupled to receive the third clock signal from the first multiplexer circuit, wherein the first local clock network is coupled to receive the third clock signal from the second clock network and to provide the third clock signal to a circuit.

2. The integrated circuit of claim 1 further comprising:
first and second regions that each comprise circuits, wherein the second clock network is a global clock network to provide global clock signals to the first and the second regions, and wherein the global clock signals are derived from the second clock signal.

3. The integrated circuit of claim 1 further comprising:
first, second, third, and fourth regions that each comprise circuits, wherein the second clock network is a quadrant clock network to provide the third clock signal to only one of the first, the second, the third, and the fourth regions.

4. The integrated circuit of claim 1, wherein the first clock signal is provided through a vertical conductor and a horizontal conductor in the first local clock network, and wherein the first clock line has a non-programmable path through the integrated circuit.

5. The integrated circuit of claim 1 further comprising:
a second interface circuit to generate the first clock signal; and
a first regional clock network coupled to the second interface circuit to provide the first clock signal to the first local clock network.

6. The integrated circuit of claim 5 further comprising:
a third interface circuit;
a second regional clock network coupled to the third interface circuit;
a second local clock network coupled to the second regional clock network;
a fourth interface circuit coupled to receive a fourth clock signal from the third interface circuit via the second regional clock network and the second local clock network, the fourth interface circuit to generate a fifth clock signal based on the fourth clock signal;
a second clock line coupled to the fourth interface circuit, wherein the second clock line has a fixed length; and
a second multiplexer circuit coupled to the second clock line, wherein the fifth clock signal is provided to the second multiplexer circuit through the second clock line, and the second multiplexer circuit provides a sixth clock signal based on the fifth clock signal,
the second clock network to provide the sixth clock signal from the second multiplexer circuit to circuit elements in the integrated circuit.

7. The integrated circuit of claim 6, wherein each of the circuit elements is a programmable logic circuit, and the third interface circuit is a high-speed serial interface circuit (HSSI).

8. The integrated circuit of claim 1, wherein the first clock line has a fixed length.

9. An integrated circuit comprising:
a first local clock network to provide a first clock signal;
a first interface circuit coupled to receive the first clock signal from the first local clock network, wherein the first interface circuit generates a second clock signal based on the first clock signal;
a first clock line coupled to the first interface circuit;
a first multiplexer circuit, wherein the second clock signal is provided to the first multiplexer circuit through the first clock line, and the first multiplexer circuit provides a third clock signal based on the second clock signal; and
a second clock network coupled to receive the third clock signal from the first multiplexer circuit,
wherein the first interface circuit comprises a second multiplexer circuit to receive the first clock signal and a signal routed from a logic circuit, and wherein the second multiplexer circuit is coupled to provide the second clock signal based on the first clock signal or the signal routed from the programmable logic circuit.

10. An integrated circuit comprising:
first and second regions that each comprise circuit elements;
a first interface circuit to provide a first clock signal;
a first clock network coupled to receive the first clock signal;
a second clock network in the first region;
a second interface circuit to generate a second clock signal based on the first clock signal, wherein the first clock signal is provided to the second interface circuit through the first and the second clock networks;
a first multiplexer circuit coupled to receive the second clock signal from the second interface circuit via a clock line, the first multiplexer circuit to provide a third clock signal based on the second clock signal, and wherein the clock line has a fixed and non-programmable length between the second interface circuit and the first multiplexer circuit; and
a third clock network to provide the third clock signal to at least one of the circuit elements.

11. The integrated circuit of claim 10, wherein the second clock network is coupled to provide the third clock signal to at least one of the circuit elements in the first region, and wherein the second clock network is coupled to the third clock network.

12. The integrated circuit of claim 10 further comprising:
third and fourth regions that each comprise circuit elements, wherein the third clock network is a global clock network coupled to provide global clock signals to the first, the second, the third, and the fourth regions, and wherein the global clock signals are derived from the second clock signal.

13. The integrated circuit of claim 10 further comprising:
third and fourth regions that each comprise circuits, wherein the third clock network is a quadrant clock network coupled to provide the third clock signal to one of the first, the second, the third, and the fourth regions.

14. The integrated circuit of claim 10, wherein the first interface circuit is adjacent to a first edge of the integrated circuit, and wherein the first multiplexer circuit is adjacent to a second edge of the integrated circuit that is perpendicular to the first edge.

15. The integrated circuit of claim 10, wherein the first interface circuit is adjacent to an edge of the integrated circuit, and wherein the first multiplexer circuit is adjacent to the first interface circuit.

16. The integrated circuit of claim 10, wherein the first clock network is a regional clock network configurable to provide clock signals from the first interface circuit to the second clock network, and wherein the second clock network is a local clock network configurable to provide clock signals to the circuit elements in the first region.

17. A method comprising:
providing a first clock signal from a first interface circuit to a first regional clock network;
providing the first clock signal from the first regional clock network to a first local clock network;
providing the first clock signal from the first local clock network to a second interface circuit;
generating a second clock signal in the second interface circuit based on the first clock signal;
providing the second clock signal to a first multiplexer circuit using a clock line having a non-programmable length;
selecting the second clock signal in the first multiplexer circuit to generate a third clock signal; and
providing the third clock signal to at least one of first and second regions of circuits using a third clock network.

18. The method of claim 17, wherein providing the third clock signal to at least one of first and second regions of circuits comprises providing global clock signals derived from the second clock signal to the first, the second, a third, and a fourth regions of circuits using the third clock network.

19. The method of claim 17, wherein providing the third clock signal to at least one of first and second regions of circuits comprises providing the third clock signal to the first region of circuits through the third clock network, and wherein the method further comprises:
selecting the second clock signal in a second multiplexer circuit to generate a fourth clock signal; and
providing the fourth clock signal to the second region of circuits through a fourth clock network.

20. The method of claim 17 further comprising:
providing the third clock signal to at least one of the circuits in the second region through the first local clock network, and wherein the first local clock network is coupled to the third clock network.

* * * * *